UNITED STATES PATENT OFFICE.

LUDWIG BAUER, OF NIEDERLOSSNITZ, GERMANY.

MEDICINAL EXTRACT.

No. 846,895.     Specification of Letters Patent.     Patented March 12, 1907.

Application filed December 8, 1904. Serial No. 235,970.

*To all whom it may concern:*

Be it known that I, LUDWIG BAUER, physiological chemist, a citizen of the Kingdom of Saxony, and a resident of Niederlossnitz, whose post-office address is No. 3 Grenzstrasse, Kötzschenbroda, in the Kingdom of Saxony, Germany, have invented certain new and useful Improvements in Medicinal Extracts, of which the following is a specification.

This invention relates to a medicine for treating diabetes.

It further relates to a process for obtaining said medicine by extracting a mixture of the dried seed and bark of the plant called "*Eugenia jambolana*" and dried cola-nuts, the latter having a salutary influence on the excretion of sugar, and especially the diabetes poison.

By means of this process, which is hereinafter described, a medicine is produced from the said mixture which has a directly salutary influence on all cases of diabetes.

In his book on diabetes Professor v. Noorden ascribes a certain therapeutic value as regards diabetes mellitus to *Jambolanum syzygium* solely and exclusively, whereas he rejects all other remedies for glycosuria without qualification.

The process is carried out in the following manner: Five thousand grams of dried seed and bark of *Eugenia jambolana* and five thousand grams of dried cola-nuts are mixed and ground as finely as possible. One hundred and twenty-five grams of lime and two thousand five hundred grams of water are then added to said mixture and the whole is triturated to pulp under the influence of gentle heat and then allowed to stand for about twenty-four hours. During this time a considerable quantity of ammonia and readily-volatile amin bases are evolved. After this the mass is stirred with warm water and is saturated with carbon dioxid until the alkalinity amounts to only from two to three per cent. The whole is then exhaustively extracted in an extractor with ten thousand grams of water heated to about 50° centigrade, the weak alkalinity increasing considerably the dissolving power. After extraction the liquid is concentrated and is filtered through freshly-reheated animal charcoal. In order to improve the flavor, any suitable tinctures may be added to the filtrate.

The fluid extract produced by my invention has a bitter taste, a specific gravity of approximately 1.020°, and reduces Fehling's solution.

For want of sufficiently successful progress in the very difficult examination of the product the nature of the effective substances obtained according to the present process from the above-mentioned drugs must for the present remain undecided. The essence of the subject-matter of the present application is distinguished in principle from the well-known processes for obtaining caffein or the glucosid "colanine" from cola-nuts, as well as from the method for obtaining "antimellin" according to German Patent 119,864 or from the hitherto-employed method of producing extracts from the above-mentioned drugs.

Of the separate steps of the present process it is true that some are well-known in their application to drugs partly for analytical and partly for technical purposes. Thus, among others, working prescriptions for lixiviating by means of alkaline liquids are well known. The determination of caffein in drugs (tea, cola) is carried out, for example, by mixing or digesting the dried powder of the drug in question with slaked lime and then extracting it with water, ether, chloroform, &c. Moreover, it is well known that alkalies—among others, lime—have a decomposing action on many alkaloids, and lime has also, in addition, the property of forming insoluble or difficultly soluble compounds with other vegetable matter and of having in this manner a purifying action, (as regards the obtaining of caffein.) The treatment of extracts (for the purpose of decolorizing the same) with charcoal is also an operation which is often employed and has long been known. Further, the treatment of organic-lime compounds with carbon dioxid for the purpose of precipitating calcium carbonate is also a well-known working process. These are substantially the older methods of treating similar drugs employed in the present process, it being their object, on the one hand, to obtain pure caffein and, on the other hand, to produce an aqueous extract of unknown composition.

The present invention has the important distinction, in comparison with the processes mentioned above, as well known, that the agents or materials which are effective against diabetes are obtained from dried cola-nuts and from the dried seed or bark of

*Eugenia jambolana* by treating these materials in a definite systematic succession of operations as follows: first, with lime under the influence of slight heat; second, with carbon dioxid for converting the lime into carbonate and decomposing a part of the calcium salt and double compounds down to a definite alkalinity; third, extracting the pulp with water at about 50° centigrade; fourth, filtering through animal charcoal for the purpose of removing the precipitated calcium carbonate and the insoluble organically-acid calcium salt still present, as well as for the purpose of decolorizing the extract.

By means of the present method of working, in contrast with the well-known separate processes a special new unexpected effect is obtained. If, namely, hitherto it had been desired to obtain the vegetable alkaloids from the drugs not in the free condition, which according to previous opinions is less effective, but in the form of the glucosid or other readily-decomposible compounds, a preliminary treatment of the drugs with alkali or bases of the alkaline earths would have been out of the question, as the glucosid are hereby decomposed, and on being treated with the application of heat the kind of sugar liberated is completely destroyed or caramelized. It would therefore have been necessary in this case to use a solvent other than water—for example, ether-chloroform or alcohol, &c. As, however, these solvents also carry into solution many other organic materials in the drugs, a subsequent liberation of the latter without destroying glucosid takes place with considerably greater difficulty than in the case of the primary treatment with lime. By means of my process this undesirable destructive effect of the alkaline earth is prevented, and solely its partial disintegrating property, with respect to the drugs, is turned to useful account. An action of excess quicklime in the presence of heat on the chemical compounds contained in the drugs is avoided. The purification of the extract is performed by means of animal charcoal, which serves chiefly to separate the calcium salt still present in the extract. That the desired effect is obtained by the process described is shown by the fact that the extract, when inverted, with Fehling's solution shows a strong power of reduction, from which property the presence of glucosid may be concluded, although success has not attended attempts to isolate the various substances, and consequently their chemical nature has not been more definitely ascertained.

Having thus described my invention, what I claim as new, and desire to secure by Letters Patent, is—

1. The herein-described process, which consists in subjecting a mixture of cola-nuts and seeds and bark of *Eugenia jambolana* to the action of milk of lime, agitating such drugs with the admixture of water, saturating the mixture with carbon dioxid, diluting with water, and filtering through animal charcoal.

2. The herein-described process, which consists in subjecting a mixture of cola-nuts and seeds and bark of *Eugenia jambolana* to the action of milk of lime, agitating such drugs with the admixture of water, saturating the mixture with carbon dioxid to reduce the alkalinity to approximately 0.2 per cent., diluting with water at substantially 50° centigrade, and filtering through animal charcoal.

3. The herein-described process, which consists in reducing a mixture of cola-nuts and seeds and bark of *Eugenia jambolana* to a fine powder, triturating such powder with milk of lime, agitating such drugs with the admixture of water, saturating the mixture with carbon dioxid, diluting with water, concentrating the liquid, and filtering through animal charcoal.

In witness whereof I have hereunto set my hand in the presence of two witnesses.

LUDWIG BAUER.

Witnesses:
   PAUL E. SCHILLING,
   PAUL ARRAS.